Figure 1:
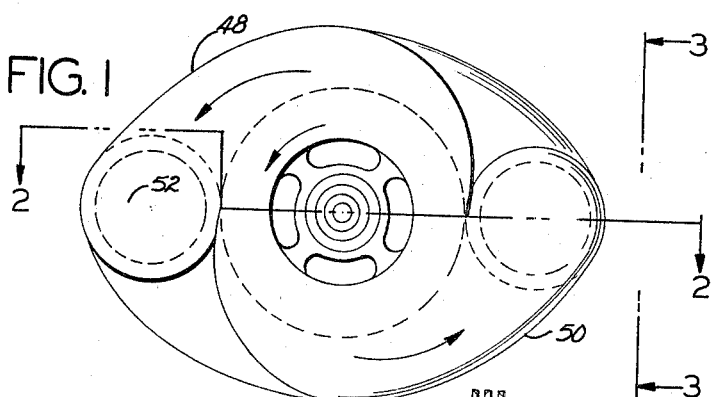

Oct. 18, 1966

C. R. POSSELL 3,279,170

GAS TURBINE POWER PLANT

Filed June 3, 1964

3 Sheets-Sheet 1

INVENTOR.
CLARENCE R. POSSELL
BY
William C. Babcock
ATTORNEY

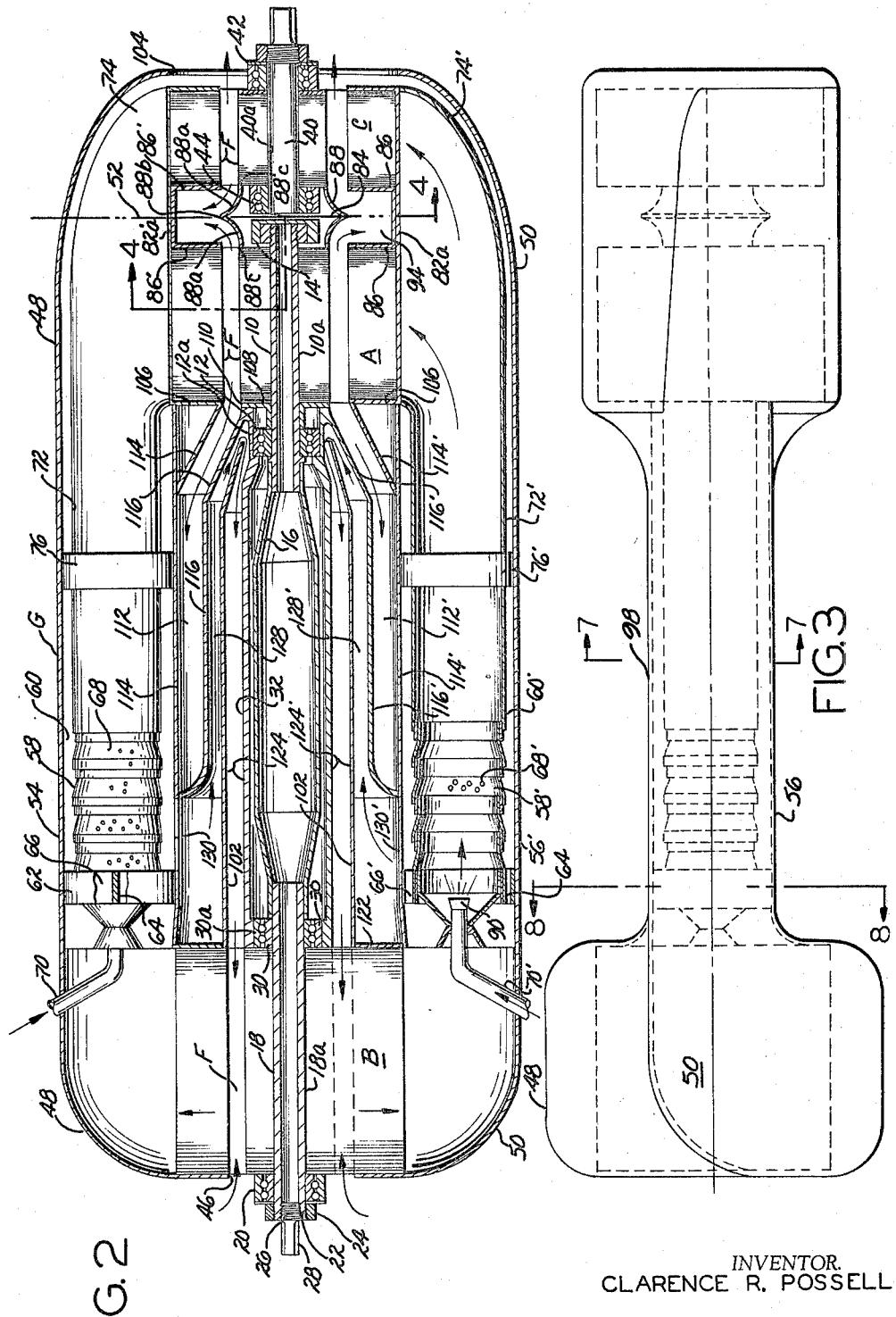

Oct. 18, 1966    C. R. POSSELL    3,279,170
GAS TURBINE POWER PLANT

Filed June 3, 1964    3 Sheets-Sheet 3

INVENTOR.
CLARENCE R. POSSELL
BY
William G. Babcock
ATTORNEY

United States Patent Office 3,279,170
Patented Oct. 18, 1966

3,279,170
GAS TURBINE POWER PLANT
Clarence R. Possell, Gardena, Calif.
(4842 Viane Way, San Diego, Calif.)
Filed June 3, 1964, Ser. No. 372,243
9 Claims. (Cl. 60—39.16)

The present invention relates to a device that may be used as a turbine when a fluid under pressure is discharged therein, or as a fluid pump or compressor when the rotor thereof is driven.

While numerous devices have been contrived in the past for transforming the energy of a moving stream of fluid into mechanical energy by the use of mechanical elements as blades, vanes, paddles, pistons, or the like, which are intermittently subjected to impulses of energy from fluid under pressure, these devices have been found to be unduly complicated in design, require elaborate facilities for the production thereof, are expensive to maintain, and require frequent replacement of expensive components thereof.

Such prior devices have been found to have a further disadvantage in that they are unable to utilize a fluid such as a hot gas in which ash or other particles of foreign material are entrained, because these foreign materials ultimately become clogged therein and obstruct operation thereof. Substantially the same operational deficiencies are prevalent amongst prior art compressors, for they normally use paddles, vanes, or blades to compress a gas, and are unable to handle either a hot or cold gas, bearing substantial quantities of particled foreign material therewith such as ash, sand, grit, or the like.

A major object of the present invention is to provide a rotary device of relatively simple mechanical structure that is inexpensive to produce, may be easily repaired, requires a minimum of maintenance attention, and one that is capable of being utilized without structural change to compress air and gases, even though the air or gas being compressed may contain substantial quantities of foreign particles such as dust, sand, grit, small cinders or the like, or one which can be used to transform the energy of such air or gases when under substantial pressure into mechanical power to rotate a drive shaft.

A further object of the invention is to supply a rotary device having a high degree of efficiency for either compressing air or gases, or to implement the energy of the compressed air or gases and transform the same into mechanical energy with a high degree of efficiency.

Another object of the invention is to furnish a rotary device in which the rotor comprises a sequence of relatively thin discs having central abutting portions that are in longitudinal alignment, with the outer portions of said discs being in spaced relationship to define annulus-shaped spaces therebetween through which air or gas can be discharged to rotate the discs, or if the discs are driven, air or gas exposed to the rotating discs is compressed and discharged from the device at a greater pressure than that at which it entered said spaces between the discs.

A further object of the invention is to provide a rotor blade of unique structure that is simple and easy to mount on a supporting shaft, and one which can be easily replaced when damaged.

A still further object of the invention is to provide a combination compressor and turbine that utilizes blade structures of the character described, which combination device acts as a compressor that, together with heating means, cooperatively supply hot gases at high velocity to the device acting as a turbine to drive the same with a high degree of efficiency.

Yet another object of the invention is to supply a combination compressor and turbine device of unique design that is compact, relatively light in weight, requires very little maintenance attention, and one that can supply power by the use of such fuels as gas, atomized high carbon materials, powdered coal, or any fuel which is relatively finely dispersed, even though the fuel when consumed produces ashes and particles of foreign material of substantial size.

Figure 4:
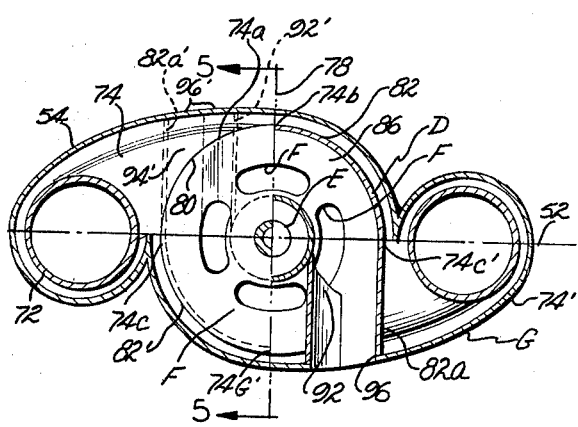
Figure 5:
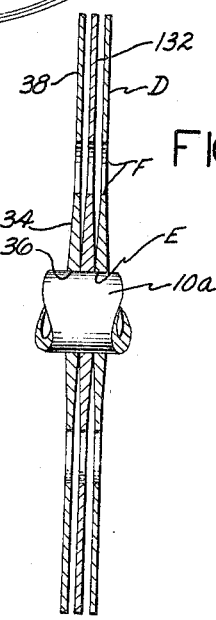
Figure 6:
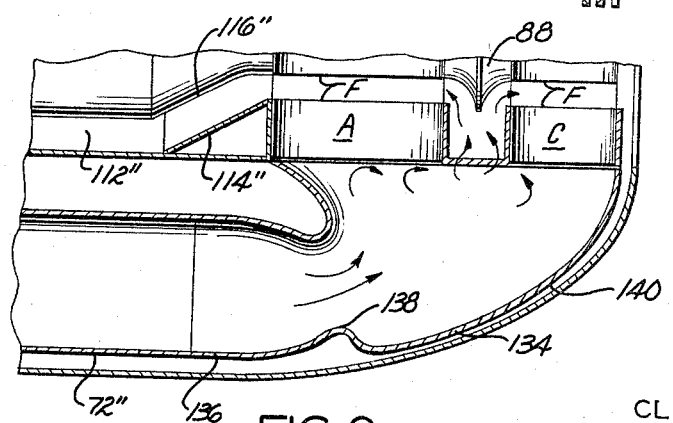
Figure 7:
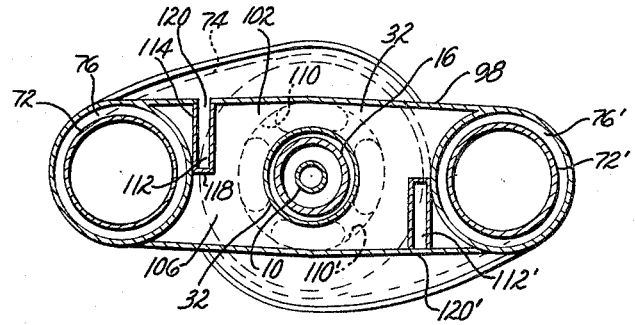
Figure 8:
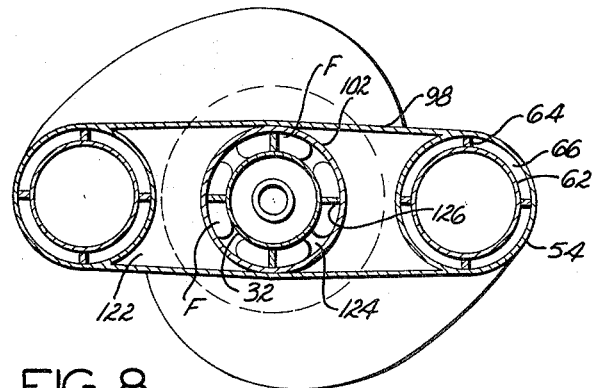
Figure 9:
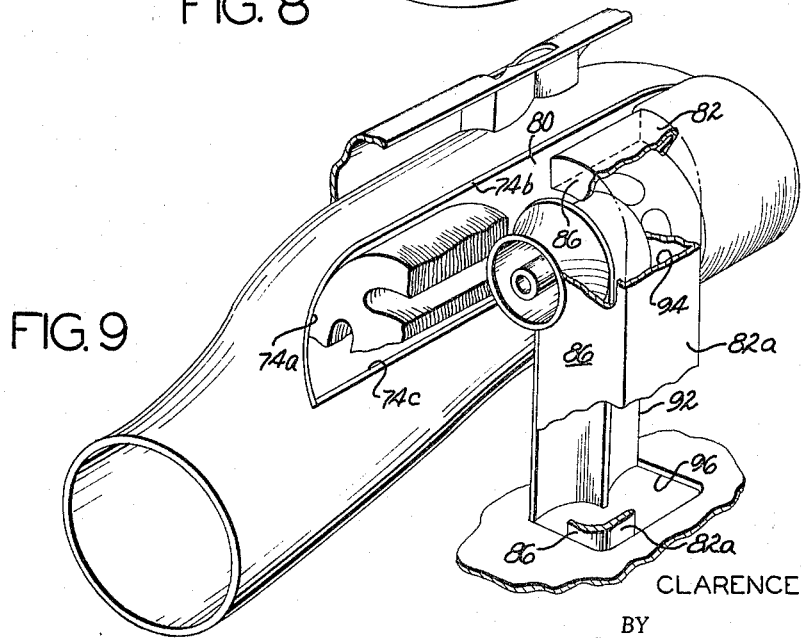

These and other objects and advantages of the invention will become apparent from the following description of a preferred form thereof, and from the accompanying drawings illustrating the same in which:

FIGURE 1 is an end elevational view of the invention;
FIGURE 2 is a longitudinal cross-sectional view of the device taken on line 2—2 of FIGURE 1;
FIGURE 3 is a side elevational view of the rotary device taken on line 3—3 of FIGURE 1;
FIGURE 4 is a combined elevational and transverse cross-sectional view of the invention taken on line 4—4 of FIGURE 2;
FIGURE 5 is a transverse cross-sectional view of the rotor blades shown in FIGURE 4 illustrating the manner in which the spacing of the outer blade portions is achieved;
FIGURE 6 is a longitudinal cross-sectional view of a modification of the rotary device illustrated in FIGURE 1;
FIGURE 7 is a transverse cross-sectional view of the device taken on line 7—7 of FIGURE 3;
FIGURE 8 is a transverse cross-sectional view of the turbine taken on line 8—8 of FIGURE 3; and
FIGURE 9 is a fragmentary perspective view of the forward portion of the combustion compressor and turbine.

With continuing reference to the drawings, the general arrangement of a preferred form of the invention is shown in FIGURES 1–3 inclusive, which includes a compressor drive turbine rotor A, a compressor rotor B, and an output power turbine rotor C. The rotor A is mounted on a shaft 10 which is rotatably supported by two longitudinally spaced, bearing assemblies 12 and 14. Shaft 10 located rearwardly of the assembly 12 is rigidly connected to a tubular, longitudinally extending shaft 16, the rear end of which is affixed to a third longitudinally extending shaft 18.

Shaft 18 supports the compressor rotor B, and the rear end of this shaft is rotatably supported in a bearing assembly 20. Threads 22 are formed on the rear end of shaft 18 which are engaged by a nut 24. Also, the rear end of shaft 18 is tapped and engaged by threads 26 formed on an elongate rigid member 28. Member 28 is connected to a power-driven starter (not shown). The forward end of third shaft 18 is rotatably supported in a bearing assembly 30. The bearing assembly 12 has an outer race 12a that fits snugly within the confines of the forward end portion of a tubular member 32 which is in coaxial alignment with the shafts 10, 16 and 18. Assembly 30 also has an outer race 30a that is mounted in the rear end of the tubular member 32, as may best be seen in FIGURE 2.

Compressor drive turbine rotor A, as may be seen in FIGURES 4 and 5, is defined by a number of circular discs or blades D. Each of the blades D has a slightly elliptical, centrally disposed bore E formed therein, which is of such configuration as to slidably and snugly engage a portion 10a of shaft 10 that is also of slightly elliptical transverse cross section. Due to the slightly elliptical configuration of the bore E and the section 10a of shaft 10, the blades D can be disposed on the shaft section in the manner shown in FIGURE 5 and will not rotate relative thereto.

Each of the blades D includes a central portion 34 that is of maximum thickness on the end 36 thereof which is in contact with the external surface of the shaft section 10a. The sides of blade portion 34 taper inwardly towards one another to merge into outer portions 38 of the blades that have substantially parallel side surfaces, with the cross section of the two portions being so selected as to provide a "constant stress" blade. A number of circumferentially spaced, elongate openings F are formed in blades D which permit the escape of fluid from the rotors A, B and C. When blades D are used on the compressor rotor B (FIGURE 2), the openings F permit the flow of air into the rotor, as will be subsequently explained.

The shaft 18 has a section 18a that is slightly elliptical in transverse cross section, sufficient to permit it to snugly but slidably engage the openings F in blades D. Output power turbine rotor C likewise comprises a sequence of blades D that are disposed in abutting contact, with the bores 36 thereof being in snug engagement with a section 40a that is slightly elliptical in transverse cross section and defined on a shaft 40 disposed forwardly of shaft 10. The forward end of shaft 40 is rotatably supported in a bearing assembly 42, and the rear end of shaft 40, in a bearing assembly 44.

A housing G encloses the mechanism above described. As may be seen in FIGURE 2, an opening 46 is formed in the rear end of housing G, which opening is of substantially the same diameter as the spacing between the outer extremities of oppositely positioned openings F. Air flows from the ambient atmosphere into the openings F of the blades D comprising the compressor rotor B. Housing G has a first rearwardly disposed volute section 48 that extends to the left (FIGURE 1), and a second volute section 50 which extends to the right. As will be noted in FIGURE 1, the volute section 48 is located above the transverse center line 52 of the invention, while the section 50 is positioned below this center line. Sections 48 and 50 are of sufficient length as to fully encompass the compressor rotor B.

The first volute section 48 is in communication with the rear end of a tubular section 54 that is a part of housing G, as best shown in FIGURE 2. Volute section 50 likewise communicates with the rear end of a second tubular section 56 forming a part of housing G, and is shown in cross section in FIGURE 2, and in elevation in FIGURE 3. Section 54 has a first burner can 58 disposed therein, which is sufficiently small in transverse cross section to define an annulus-shaped space 60 between the exterior surface of the can and the interior surface of section 54.

A first ring 62 is provided (FIGURE 2) that is affixed to the interior surface of section 54. Circumferentially spaced legs 64 extend inwardly from ring 62 to engage and support the rear end portion of the first can 58. The interior surface of ring 62, the external surface of the rear portion of can 58, and the side walls of legs 64 define a number of circumferentially extending passages 66 through which air may be discharged from the first volute section 48 forwardly to enter perforations 68.

A fuel nozzle 90 is disposed within the rear end portion of the first burner can 58, and fuel is supplied thereto by a fuel inlet pipe 70, which extends outwardly through the first volute section 48. Air for the combustion of fuel delivered to the nozzle 90 through fuel inlet 70 is discharged under pressure from the compressor B through the volute section 48, passages 66 and perforations 68.

The forward end of the burner can 58 (FIGURE 2) is connected to a tubular hot air duct 72, which develops into an elongate nozzle 74. A second ring 76 encircles the duct 72, and the outer surface of this ring abuts against the interior surface of section 54, with the inner surface of the ring contacting the external surface of the duct 72. The ring 76 supports the duct 72 in spaced relationship with the tubular section 54, and this ring also serves as a barrier to prevent air discharged from the compressor rotor B from flowing forwardly into the space 60 beyond the rear face of the ring.

The discharge opening 80 of nozzle 74, as can best be seen in FIGURE 9, is defined by two longitudinally spaced, transversely extending curved edges 74a of substantially the same radius of curvature as that of the periphery of rotors A and B, an upper longitudinally extending edge 74b, and a lower longitudinally extending edge 74c. Edge 74b is preferably in vertical alignment with the vertical center line 78 shown in FIGURE 4, while the edge 74c is in substantially horizontal alignment with the center line 52, also shown in FIGURE 4.

Nozzle 74 has a narrow extension 82 that is in transverse alignment with a space 84 between the rotors A and C. In the upper right-hand quadrant of the rotors A and C, extension 82 curves downwardly and to the right to develop into a straight-walled, vertically extending section 82a, the purpose of which will hereinafter be explained. Two identical flanges 86 extend inwardly from the edges of extension 82 and section 82a thereof. The flanges 86 are not sufficiently wide as to cover any portions of openings F.

A ring-shaped heat shield 88 encircles the two bearing assemblies 14 and 44, as illustrated in FIGURE 2, and this shield is preferably defined by two circumferentially extending concave surfaces 88a. The inner ends of surfaces 88a merge to define a circumferentially extending edge 88b that is in transverse alignment with the center line 52. Surfaces 88a also have outer edges 88c that are disposed adjacent the outer circumferential edges of rotors A and C in space 84.

A second burner can 58' is disposed within the tubular section 56 which is identical in structure to the first burner can 58. Can 58' communicates with a second duct 72' that is structurally identical to the first duct 72, and the second duct in turn develops into a second nozzle 74'. Nozzle 74' is identical to the first nozzle 74, except that it extends downwardly and inwardly rather than upwardly and inwardly in the manner of the first nozzle.

Inasmuch as the structures of the second burner can, second duct and second nozzle are identical to the first burner can, first duct and first nozzle, the supporting structure associated with the second burner can, duct and nozzle will be identified herein by the same numerals used in identifying the first, but to which a prime is affixed. It would be possible to employ more than two burner cans if desired, or the burner could envelope the whole engine. The latter design is commonly referred to in the industry as a "circumferential" burner can.

A fuel nozzle 90 is mounted on the forward end of fuel inlet pipe 70' situated inside the second burner can 58', and this nozzle is adapted to handle gas, powdered coal or any other type of fuel that can be discharged through a pipe or conduit to be consumed within the confines of the second can. A similar nozzle (not shown) is provided on the end of the fuel inlet line 70 and is positioned within the confines of the first burner can 58. The two nozzles 90 are adapted to be operated concurrently by fuel supplied thereto through the lines 70 and 70'.

An extension 92 of the heat shield 88 projects tangentially downwardly therefrom, and the outer edges of this extension are contacted by the inner edges of flanges 86 in the lower right-hand quadrant of the invention as illustrated in FIGURE 4. The section 82a of extension 82, flanges 86, and the heat shield extension 92 cooperatively define a downwardly extending passage 94 that is in communication with a discharge opening 96 formed in housing G. It will be noted in FIGURE 4 that the section 82a, flanges 86 and heat shield extension 92 extend downwardly in front of the second nozzle 74' to thus prevent discharge of hot gases therefrom from entering the rotors A and C in a direction to oppose their rotation by gases discharged from the first nozzle 74.

The second nozzle 74' has an extension 82' from which a section 82' connected thereto extends upwardly to the left of center line 78, as may be seen in FIGURE 4. The heat shield 88 has an extension 92' that is tangentially disposed relative thereto as shown in the upper left-hand quadrant of the invention illustrated in FIGURE 4. Flanges 86' project from the longitudinal edges of extension 82' and section 82a', and these flanges cooperate with the heat shield extension 92' to define a passage 94' which is in communication with a discharge opening 96' formed in the housing G. Section 82a', shield extension 92' and flanges 86' cooperatively define the passage 94 which extends upwardly in front of the first nozzle 74. Extension 92' and flanges 86' prevent entrance of hot gases discharged from nozzle 74 into the rotors A and C in a direction opposing their rotation by the gases discharged from the second nozzle 74'. The passage 94 is in transverse alignment with the space between rotors A and C.

The housing G includes an intermediately disposed section 98 of generally rectangular cross section that extends rearwardly from the volute portions 48 and 50 to the forward end of a rear section in which the rotor B is located. Housing section 98 has a longitudinally extending tube 102 therein that is substantially greater in internal diameter than the tubular member 32.

In addition to discharging through the passages 94 and 94' to the ambient atmosphere, the hot gases discharged into the rotors A and C from the nozzles 74 and 74' may also discharge forwardly from the invention through an opening 104 formed in the forward end of the housing G, as shown in FIGURE 2. Also, hot gases discharged into the rotor A from the nozzles 74 and 74' may flow rearwardly from the openings F in the direction of the arrows shown in the same figure. A transverse plate 106 extends across the forward end of the section 98 of housing G, as may best be seen in FIGURES 2 and 7. Plate 106 has a centrally disposed boss 108 extending rearwardly therefrom, through which the shaft 10 projects.

An arcuate opening 110 is formed in the upper left-hand quadrant of plate 106 (FIGURE 7), and this opening is connected to a rearwardly extending passage 112 defined by two upwardly extending, transversely spaced side walls 114 and 116 which are connected at their lower ends by a bottom 118. The upper ends of the side walls 114 and 116 abut against the interior surface of the sheet material defining the section 98. The rear end of wall 116 curves outwardly, as illustrated in FIGURE 2, to intersect the wall 114, and the forward portions of the walls 114 and 116 and bottom 118 extend forwardly and inwardly at an angle to terminate at the edge portions of the opening 110.

An opening 120 is formed in the sheet material defining section 98, and is in communication with passage 112 whereby gases discharged through this passage may pass into the ambient atmosphere. A second opening 120' is formed in the lower right-hand quadrant of the invention (FIGURE 7), and a second passage 112' is provided by a second structure identical to that of passage 112. The same numerals used in illustrating the structure defining the passage 112, are employed in connection with the passage 112, except that primes have been added thereto. Passage 112' communicates with an opening 120' formed in housing section 98, as shown in FIGURES 2 and 7.

The rear end of housing section 98 (FIGURES 2 and 8) is closed by a transversely extending plate 122 that is disposed adjacent the forward end of the rotor B. The tubes 32 and 102 define an annulus-shaped passage 124 that communicates with the opening F in rotor B, for reasons to be hereinafter explained. A number of legs 126 extend inwardly from tube 102 to support the rear end of tube 32 in which bearing assembly 30 is mounted. The forward portion of tube 102 tapers inwardly, as may best be seen in FIGURE 2, and terminates rearwardly of the walls 116 and 116'. The walls 116 and 116', together with the exterior surface of tube 102, cooperatively define two longitudinally extending passages 128 and 128' that are in communication with the passage 124. Openings 130 and 130' are formed in the inner ends of the tubular members 54 and 56, rearwardly of the rings 62 and 62' respectively. Openings 130 and 130' are in communication with passages 128 and 128'.

The present invention operates in the following manner. The rotatable member 28 is removably engaged by a conventional power-operated starting device (not shown), and the shafts 18, 16 and 10, together with the compressor rotor B and compressor drive turbine rotor A, are driven concurrently. Fuel is then discharged through the fuel inlet pipes 70 and 70' to the burners 90 and 90' where the fuel is ignited by an igniter (not shown) and the resultant fuel-gas mixture is consumed. As the compressor rotor B is driven, air enters the spaces F thereof from the ambient atmosphere, and the air in these openings F is subjected to friction from the moving blades and begins to rotate. As the rotational speed of the air increases, it is subjected to an increasing centrifugal action which tends to move it outwardly toward the portions 38 of the blades D, as shown in FIGURE 5. The body of air in the annulus-shaped spaces 132 between the blade portions 38 of rotor B contacts the adjacent surfaces of sections 38 and is caused to rotate due to this friction. However, due to the centrifugal action to which the air in spaces 132 is subjected, the portion of air between the adhering sections thereof is sheared therefrom and thrown outwardly from the rotating blades D to be replaced by additional air flowing therein from the ambient atmosphere through openings F. Thus, due to the rotating blades D of compressor rotor B, air at higher than atmospheric pressure discharges into the section 100 of housing G, and flows forwardly therefrom through the passages 66 and 66' in rings 62 and 62' to the spaces 60 and 60' surrounding the two burner cans 58 and 58'.

Air at this increased pressure passes into the burner cans 58 and 58' through the perforations 68 and 68' respectively. The quantity of air flowing into the cans 58 and 58' through the perforations 68 and 68' will be mixed with the right amount of fuel to maintain a proper fuel-air ratio and will then be consumed. The hot gases of combustion resulting from the comsumption of fuel flow forwardly in ducts 72 and 72' to the nozzles 74 and 74', as may best be seen in FIGURES 2 and 4. The gas that discharges from nozzle 74' enters the upper left-hand quadrant of rotors A and C to flow through the spaces 132 between blades D. Gases discharged from nozzle 74' in the lower right-hand quadrant of the rotors A and C (FIGURE 4) also flow through the spaces 132.

Hot gases from the nozzle 74 are prevented from entering the space 84 between rotors A and C by the extension 82a', and gases discharging from the nozzle 74' are prevented from entering space 84 by the section 82a. The hot gas discharged into rotors A and C from nozzles 74 and 74' can traverse the spaces 132 defined between blades D and pass from the openings F into either the passage 94 and 94', may flow forwardly from openings F into the ambient atmosphere from the forward end of rotor C, or may discharge rearwardly from openings F of rotor A to the passages 112 or 112' shown in FIGURE 7. By means of openings 120 and 120', the passages 112 and 112' respectively are in communication with the ambient atmosphere, and the gases discharged from rotor A are free to flow thereto. As the rotor A is driven by gases discharged thereto from the nozzles 74 and 74', the rate of rotation of rotor A increases, as does the speed of rotation of rotor B.

The force which tends to rotate rotors A and C is the drag imposed thereon due to passage of the hot combustion gases as they contact the blades D in flowing through the spaces 132. The drag force may be determined by the formula $$D = C_d \frac{p}{2} S V^2$$

wherein "$C_d$" is the coefficient of drag, "$p$" is density of the gases, "$S$" is the area, and "$V$" is the velocity (in feet per second). The horsepower generated by the power rotor C will be $H.P. = DV/550$ wherein "$D$" is the drag in pounds and "$V$" is the velocity in feet per second. Thus, the kinetic energy of the rotor C may be raised by increasing the velocity at which the hot gases discharge through the spaces between the rotor blades D. This increase in velocity of the discharging gases is conveniently accomplished by use of the modification of the invention shown in FIGURE 6.

In the modification of the present invention, all parts remain the same with the exception of the nozzles 74 and 74', each of which is replaced by a nozzle 134, and one of which is illustrated in FIGURE 6. The components comprising this form of the invention common to the preferred form thereof are identified in the drawings by the same numerals, but are distinguished therefrom by the use of a double prime.

The rear end of a nozzle 134 is in abutting contact with the forward end of a duct 72". Nozzle 134 has a convergent section 136, a throat 138, and a divergent section 140, and the dimensions of this nozzle are critical relative to the interior dimensions of the ducts 72" connected thereto.

The interior dimensions of each duct 72", the air discharge capacity of the rotor B, and the fuel consumption capacity of the nozzles not shown, but identical to nozzles 90 and 90', must be such that the gases of combustion are discharged to section 136 at just below the upper limit of subsonic flow at design r.p.m. As the combustion gases flow through convergent section 136, they increase to sonic velocity and then to supersonic velocity as they discharge from the divergent section 140. This increase in velocity of combustion gases as they contact the blades D in flowing through the spaces 132, increases the horsepower output of the rotors A and C. In the modified form of the invention a second nozzle (not shown), identical in structure to that of nozzle 134, is connected to the forward end of the duct identified by the numeral 72 in FIGURE 2.

In the aircraft field, a vast amount of research has been done in recent years on development of surface finishes for airfoils to minimize the "coefficient of drag." The finish on the blades D in the present invention, and the cross section thereof should, in contrast to those used on aircraft and missiles, be selected from the standpoint of maximum "coefficient of drag" in order that a maximum power output may be attained from the combustion gases as they discharge through the rotors A and C.

In the operation of both the preferred and modified forms of the invention, combustion gases are discharged into the upper and lower halves of the rotors A and C at high velocity. Those portions of these streams of discharging gases near the periphery of the rotors for a given angle of arc, travel further than a portion of gas located inwardly therefrom. Therefore, the outer portions of the gases are subjected to greater frictional resistance due to contact with the blades D, and will decrease in velocity at a greater rate than inwardly disposed portions of the gas streams.

It is well known, and in accordance with Bernoulli's theorem, that the total energy in any system remains constant. In other words, if one element of any energy system increases, another decreases to counterbalance it. Therefore, as the inwardly moving portion of the gaseous stream discharging through the rotors A and C decreases in velocity, the pressure thereon increases. This increasing pressure on the inwardly moving portions of the stream of gases causes it to follow a spiral path prior to discharging through the openings F.

In FIGURE 2 it will be particularly noted that the stream of combustion gases discharge from the openings F on both the right and left-hand side of rotors A and C to provide two counterbalancing forces. As a result of the two counterbalancing forces, the shafts 10 and 40 supporting rotors A and C are not subjected to any substantial axial thrust. The rotor B acts in the capacity of a compressor or blower. Air from the ambient atmosphere enters the spaces 132 in rotor B through the openings F. This air due to contact with the blades D of rotor B is subjected to an increasing angular velocity, and as the velocity increases, the air is subjected to an increasing centrifugal force. Air entering the rotor B moves outwardly therethrough in a spiral path to discharge at high velocity into the ducts 72, 72' or 72" to support the consumption of fuel in the burner cans 58.

In referring to the operation of the nozzles 90 and the burner cans 58 and 58", reference has been made to the gases of combustion. This term is used herein to include both the products of combustion from the fuel, irrespective of whether they are gaseous, solid or liquid, as well as partially burned components and air that may be carried along with the previously mentioned products.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claims.

I claim:
1. A power producing rotary turbine, including:
   (a) a compressor drive turbine rotor defined by a plurality of first thin circular discs disposed in side-by-side relationship, with at least the outer portions of said discs being separated to form a plurality of first circular passages therebetween, and said first discs having a plurality of longitudinally aligned first openings formed therein that are in communication with said first passages;
   (b) a first shaft on which said compressor drive turbine rotor is rigidly mounted;
   (c) a rotary compressor connected to said first shaft and driven thereby;
   (d) an output power turbine rotor coaxially aligned with said drive turbine rotor but longitudinally spaced therefrom, which output power turbine rotor is defined by a plurality of second thin circular discs disposed in side-by-side relationship, with at least the outer portions of said discs being separated to form a plurality of second circular passages therebetween, and said second discs having a plurality of longitudinally aligned second openings formed therein that are in communication with said second passages;
   (e) a second shaft for producing power rigidly connected to said output power turbine rotor;
   (f) fuel burning means disposed adjacent said rotors that receives air under pressure at a first end of said means and delivers a stream of gaseous products of combustion under pressure from a second end thereof;
   (g) first passage defining means extending from the discharge of said rotary compressor to said first end of said fuel burning means for delivering air under pressure thereto as said turbine rotor drives said first shaft;
   (h) second passage defining means extending from said second end of said fuel burning means to said compressor drive turbine rotor and said output power turbine rotor for directing said stream into semi-cylindrical portions of said rotors to rotate the same due to the drag on said rotors as said stream flows through said first and second passages, with said stream discharging from the outer circumferential extremities of said first and second passages as well as through said first and second openings;
   (i) shield means disposed between said compressor drive turbine rotor and said output power turbine rotor for preventing said stream from flowing between said two rotors, and entering said two rotors in a direction to impede the rotation thereof;
(j) third means for heating at least a portion of the air flowing into said compressor by heat in said products of combustion that discharge from said first openings; and
(k) fourth means for rotatably supporting said first and second shafts in fixed spaced relationship with one another and to said compressor.

2. A turbine as defined in claim 1 wherein said fuel burning means comprises an elongate burner can, and said turbine further includes:
(1) a housing that envelops at least said compressor drive turbine rotor and output power turbine rotor and said shield means, with said housing having at least one first discharge opening formed therein through which a portion of said stream of products of combustion can flow to the ambient atmosphere from said first and second passages, as well as a second discharge opening through which a portion of said stream of products of combustion can flow into the ambient atmosphere from said second openings.

3. A turbine as defined in claim 1 wherein said fuel burning means comprise a plurality of burner cans in which said second passage defining means extend from second ends thereof to oppositely disposed semi-cylindrical portions of said two rotors, and said turbine further includes:
(1) a housing that envelops at least said two rotors and said shield means, with said housing having two oppositely directed first discharge openings formed therein through which portions of said streams of combustion can flow into the ambient atmosphere from said first and second passages, as well as a second discharge opening through which a portion of said streams of products of combustion can flow to the ambient atmosphere from said second openings.

4. A turbine as defined in claim 1 wherein portions of said first and second shafts are of a transverse cross section other than circular, and said first and second discs have centrally disposed openings formed therein that are of a shape other than circular and of such size as to snugly and slidably engage said portions of said first and second shafts, with said shaft portions and openings cooperatively holding said discs in non-rotatable positions relative to said shafts.

5. A device as defined in claim 1 wherein said rotary compressor includes a plurality of third thin circular discs disposed in side-by-side relationship, the outer portions of which are separated to form a plurality of third circular passages therebetween, said discs having a plurality of longitudinally aligned third openings formed therein that are in communication with said third passages with said third means delivering heated air to said third openings from which said heated air flows into said third passages to be compressed due to the rotation of said third discs and flows in said compressed state into said first passage defining means.

6. A devce as defined in claim 1 wherein said rotary compressor includes a plurality of third thin circular discs disposed in side-by-side relationship, the outer portions of which are separated to form a plurality of third circular passages therebetween, said discs having a plurality of longitudinally aligned third openings formed therein that are in communication with said third passages, which third means deliver heated air into said third opening from which said heated air flows into said third passages to be compressed due to the rotation of said third discs and flows in said compressed state into said first passage defining means, with said third openings being in communication with the ambient atmosphere, and with a portion of the air compressed by rotation of said third discs being drawn therefrom.

7. A device as defined in claim 1 wherein at least the center extremities of said first and second discs are in abutting contact on said first and second shafts, which discs are of tapered transverse cross section to define said first and second circular passages of V-shaped transverse cross section.

8. A device as defined in claim 1 wherein at least the center extremities of said first and second discs are in abutting contact on said first and second shafts, which discs are of such tapered transverse cross section as to provide sections of constant strength, with said discs cooperatively defining said first and second passages therebetween that are of V-shaped transverse cross section.

9. A device as defined in claim 1 which further includes:
(1) a nozzle connected to said second passage means adjacent said first and second rotors that imparts supersonic velocity to said stream of products of combustion as said stream discharges from said nozzle.

References Cited by the Examiner
UNITED STATES PATENTS

| | | | |
|---|---|---|---|
| 1,061,142 | 5/1913 | Tesla | 103—84 |
| 1,061,206 | 5/1913 | Tesla | 253—133 |
| 2,371,889 | 3/1945 | Hermitte | 60—39.03 |
| 2,795,928 | 6/1957 | Huebner et al. | 60—39.16 |
| 3,045,428 | 7/1962 | McLean | 60—39.75 |

JULIUS E. WEST, *Primary Examiner.*